United States Patent
Dow (10) Patent No.: US 11,655,765 B2
(45) Date of Patent: May 23, 2023

(54) AIR TURBINE STARTER TORQUE CONTROL SYSTEM

(71) Applicant: Parker-Hannifin Corporation, Cleveland, OH (US)

(72) Inventor: Steven C. Dow, Fountain Valley, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 78 days.

(21) Appl. No.: 17/523,470

(22) Filed: Nov. 10, 2021

(65) Prior Publication Data

US 2022/0195942 A1   Jun. 23, 2022

Related U.S. Application Data (60) Provisional application No. 63/128,887, filed on Dec. 22, 2020.

(51) Int. Cl.
*F02C 7/277* (2006.01)
*F02N 7/12* (2006.01)

(52) U.S. Cl.
CPC ............... *F02C 7/277* (2013.01); *F02N 7/12* (2013.01); *F02N 2300/104* (2013.01); *F05D 2260/85* (2013.01); *F05D 2270/02* (2013.01); *F05D 2270/052* (2013.01); *F05D 2270/301* (2013.01)

(58) Field of Classification Search
CPC ...... F02C 7/277; F02N 7/12; F02N 2300/104; F05D 2260/85
See application file for complete search history.

(56) References Cited

U.S. PATENT DOCUMENTS

| | | | |
|---|---|---|---|
| 10,040,577 B2 | 8/2018 | Teicholz et al. | |
| 10,830,199 B2 | 11/2020 | Lilie et al. | |
| 2018/0328286 A1* | 11/2018 | Nayak | F01D 5/02 |
| 2019/0017484 A1 | 1/2019 | Blanco et al. | |
| 2020/0088103 A1* | 3/2020 | Ajami | F02C 7/32 |
| 2020/0232577 A1 | 7/2020 | Dehais | |

FOREIGN PATENT DOCUMENTS

CN   108035810 B   8/2019

* cited by examiner

*Primary Examiner* — Scott J Walthour
(74) *Attorney, Agent, or Firm* — Renner, Otto, Boisselle & Sklar, LLP (57) ABSTRACT

An enhanced engine starter system controls an air turbine starter at the startup of operation of a turbine engine. The engine starter system includes an air turbine starter (ATS) that operates in accordance with more than one speed/torque curve during the startup procedure. A controller commands the starter control valve to provide a regulated pressure to the ATS in accordance with a first speed/torque curve to initiate the gas turbine engine startup without exceeding a maximum or design limiting torque. Overall duration of the startup procedure is reduced by the controller subsequently operating the ATS in accordance with a second speed/torque curve having a higher operational pressure once the ATS reaches a predetermined transition speed. The torque at the predetermined transition speed on the higher pressure second curve remains less than the design limiting torque, but provides a higher torque as compared to the first speed/torque curve to reduce the duration of the startup procedure.

19 Claims, 4 Drawing Sheets

Fig. 1

AIR TURBINE STARTER TORQUE CONTROL SYSTEM

FIELD OF INVENTION

The present application relates generally to systems and methods for control systems for air turbine starters, and more particularly to systems and methods for improved startup of a gas turbine or other engine using an air turbine starter that minimizes low speed torque without requiring a complex control system, such as for use for example in aviation.

BACKGROUND

Gas turbine engines are an important class of engine that is the core of various engine sub-classes. These sub-classes are broadly categorized as either turbojet and turbofan engines or turboshaft engines. Turbojet engines and turbofan engines are used in aircraft, both civilian and military, and an output shaft of turboshaft engines power propellors or rotors in aviation. Alternatively, the output shaft of turboshaft engines may also turn generators or pumps in land and marine based applications. As issue associated with such types of engines is the manner of turbine start control at the initiation of engine operation. Generally, turbine startup operation is begun by applying an external power to the gas turbine engine so that a turbine core may be rotated until a critical "light off" speed is achieved while simultaneously introducing fuel to the gas turbine engine. The performance of this operation is continued until a predetermined "cutout" speed is achieved, at which point the gas turbine engine operates by its own power while receiving fuel from the fuel system.

Common methods used to rotate the gas turbine engine at turbine engine startup include electric motors and air turbine starters. Particularly, air turbine starters are part of a class of devices that convert input air horsepower, which is a function of pressure, temperature, and air flow, into shaft horsepower which is a function of shaft torque and speed. Air turbine starters typically include a turbine that is spun to impart initial rotation to start the turbine engine. Conventional air turbine starters use a high flow pressurized air source, a gearing mechanism, and a decoupling clutch mechanism that disengages once a main turbine engine is operational. Once the gas turbine engine achieves its predetermined cutout speed, the air to the air turbine starter is turned off and the clutch decouples the air turbine starter from the gas turbine engine, at which point the gas turbine engine continues to rotate unassisted while fuel is provided from the fuel system.

In conventional configurations, a gas turbine engine is started by applying a fixed inlet pressure, temperature, and flow to the air turbine starter, whether with a pressure regulating valve or with a simple open/close valve if the air pressure source is not excessive. The gas turbine engine and any intermediary torque transfer apparatus must be able to endure the torque applied by the air turbine starter, including the innately high stall torque from the air turbine starter that is applied at initial startup when the air turbine starter speed is zero. Conventional configurations of engine starter systems do not provide optimum startup efficiency when balancing the need to apply effective torque from the air turbine starter while avoiding a torque that is above the design limits of the engine components, and thus the duration of the engine startup procedure may be undesirably long.

SUMMARY OF INVENTION

The present application pertains to an enhanced engine starter system including an air turbine starter (ATS) for initiation of operation of a turbine engine, such as may be used in aviation or other applications that employ gas turbine engines. The engine starter system has a controller that operates the two-pressure level commanded starter control valve which provides controlled pressurized air to the ATS to limit a maximum torque applied to the gas turbine engine and any intermediary torque transfer apparatus to be below design limits, while reducing the startup time of the gas turbine engine. The engine starter system generally includes the controller configured to communicate with a starter control valve based on a start command and ATS or engine speed, and an external pressure source that is communicative with the starter control valve to provide an input pressure to the ATS that is regulated by the valve. The ATS receives a regulated input pressure from the starter control valve, and the ATS is coupled to the engine by a decoupler that operates to decouple the engine from the ATS when the ATS reaches the cutout speed, and the engine startup procedure is complete. The engine or ATS transmits a speed signal back to the controller in a feedback mechanism for monitoring the startup procedure from initiation to completion when the engine is decoupled from the ATS.

In this application, the engine starter system controller runs the ATS in accordance with more than one speed/torque curve. The controller of the system commands the starter control valve, which pressurizes the ATS in accordance with a first speed/torque curve to rotate the gas turbine engine without exceeding a maximum or design limiting torque. Once the ATS reaches a predetermined transition speed, the starter control valve is commanded to operate at a different (higher) pressure, establishing a second (higher) speed/torque curve in the ATS. The torque at the predetermined transition speed on the higher pressure second ratio curve remains less than the design limiting torque, but provides a higher torque as compared to the first speed/torque curve to reduce the duration of the startup procedure.

Although the engine starter system of the present disclosure is described principally in connection with the startup of turbines in gas turbine engines, comparable principles may be applied to the startup of the rotary components of other types of engines. For example, the engine starter system can be used to accomplish starting of other combustion engine types, such as for example reciprocating internal combustion engines. The engine starter system can also be used in other applications, such as for example in continuous duty turbine drives, in which high torque mitigation at low speed is desired.

An aspect of the invention, therefore, is an engine starter system and related method of startup of a turbine engine that provides enhanced control of an air turbine starter to reduce the duration of startup of the turbine engine. In exemplary embodiments, the engine starter system includes an air turbine starter that receives an input flow of pressured air, wherein the air turbine starter is configured to rotate during a startup procedure of a turbine engine to start the turbine engine; a control valve that receives an external flow of pressurized air and regulates the external pressure to provide the input flow of pressurized air at a regulated pressure to the air turbine starter; and a controller. The controller may take the form of discrete electronics (hardware), mechanical switches or a computerized controller (hardware, firmware and/or software). The controller is configured to command the starter control valve to provide the input pressure to operate the air turbine starter in accordance with a first speed/torque curve until a speed of the air turbine starter reaches a predetermined transition speed. Upon the air turbine starter reaching the transition speed, the controller is configured to command the starter control valve to provide the input pressure to operate the air turbine starter in accordance with a second speed/torque curve until the speed of the air turbine starter reaches a predetermined cutout speed, at which time the controller commands the starter control valve to close. A torque at a given speed along the second speed/torque curve is greater than a torque at the same speed along the first speed/torque curve to reduce the duration of the engine startup procedure. In a more complex implementation, this start scheme can be broken into three or more segments and speed/torque curves.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Embodiments of the present application will now be described with reference to the drawings, wherein like reference numerals are used to refer to like elements throughout. It will be understood that the figures are not necessarily to scale.

The present application pertains to an enhanced engine starter system for controlling an air turbine starter at the startup of operation of a turbine engine. In general, the engine starter system includes a starter control valve configured to operate at two different outlet pressure modes, commanded by simple input signals, and an ATS that operates in accordance with more than one speed/torque curve during the startup procedure. A controller operates the starter control valve and ATS in accordance with a first speed/torque curve to initiate the gas turbine engine startup without exceeding a maximum or design limiting torque. Overall duration of the startup procedure is reduced by the controller subsequently operating the starter control valve and ATS in accordance with a second speed/torque curve having a higher operational pressure once the ATS reaches a predetermined transition speed. The torque at the predetermined transition speed on the higher pressure second speed/torque curve remains less than the design limiting torque, but provides a higher torque as compared to the first speed/torque curve to reduce the duration of the engine startup procedure.

Figure 1:
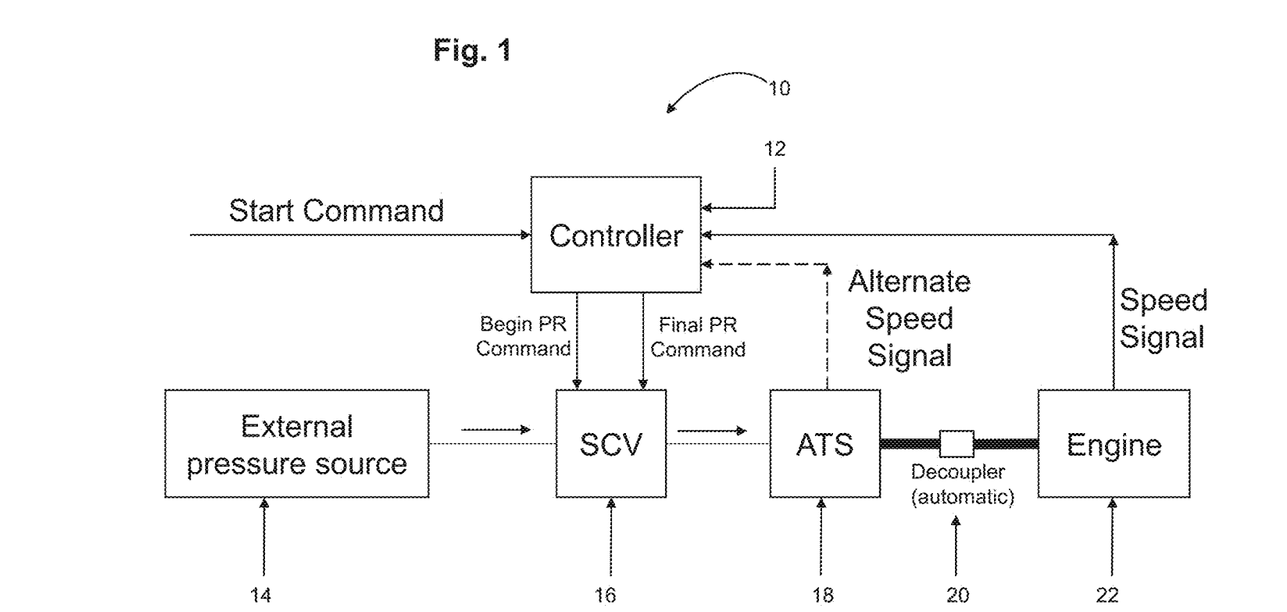
FIG. 1 is a drawing depicting a functional block diagram of operative portions of an exemplary engine starter system.

FIG. 1 is a drawing depicting a block diagram of operative portions of an exemplary engine starter system 10 that employs an air turbine starter to start a gas turbine engine. The engine starter system 10, for example, may be used in aviation or other applications that employ gas turbine engines. The engine starter system 10 is suitable for minimizing the complexity of an optimal startup of a gas turbine engine by permitting the usage of a simplified control of the start signal pathways. The engine starter system 10 includes a controller 12, an external pressure source 14, a starter control valve (SCV) 16, and an air turbine starter (ATS) 18. The ATS 18 operates to initiate startup of an engine 22, such as a gas turbine engine, and the ATS 18 is coupled to the engine 22 via a decoupler 20. Once the ATS has completed the startup procedure for starting the engine 22, the decoupler 20 operates to decouple the engine 22 from the ATS 18, and thereby decouple the engine 22 from the engine starter system generally, with the engine 22 subsequently operating while receiving fuel from the fuel system. The ATS 18 is allowed to coast to a stop by action of the decoupler 20.

The SCV 16 may be a three-state regulator valve that is in signal communication with the controller 12. A normal state of the SCV 16 is a closed position, in which case no pressure or flow is transmitted through the SCV 16 to the ATS 18. Similarly, when the SCV 16 undergoes a failsafe operation, the SCV 16 also is in the closed position. The controller 12 generates an electronic control signal for control of operation of the SCV 16. For example, the controller 12 may provide a first command signal that causes the SCV 16 to initiate and perform pressure regulation in which the degree of opening of the SCV will vary to regulate pressure below a certain defined control speed, and the controller 12 may provide a second command signal that causes the SCV 16 to operate at full opening or regulation at a second pressure above a certain defined control speed. When neither the first nor second control signals is present, the SCV 16 may be closed as the default position as referenced above. The external pressure source 14 may be any suitable source of a pressurized air flow, and the pressurized air flow regulated via the operation of the SCV 16, subsequently inputted to the ATS.

In exemplary embodiments, the controller 12 is an electronic controller that includes a hardware configured logic to control the starter control valve based on an ATS or engine speed signal input and an input command. An alternate controller may include an electronic processor, such as a CPU, microcontroller or microprocessor. The electronic processor may execute program code embodied as a starter control application to implement the process steps associated with startup of the engine 22. It will be apparent to a person having ordinary skill in the art of computer programming, and specifically in application programming for electronic control devices, how to program the controller to operate and carry out logical functions associated with starter control. Accordingly, details as to specific programming code have been left out for the sake of brevity. The starter control application may be stored in a non-transitory computer readable medium, such as a random-access memory (RAM), a read-only memory (ROM), an erasable programmable read-only memory (EPROM or Flash memory), or any other suitable medium. Instructions for performing startup control that are stored in the non-transitory computer readable medium of the controller 12 may be executed by the processor component of the controller 12. Such controller functionality could also be carried out via dedicated hardware, firmware, software, or combinations thereof, and may be integral in a single electronic control device or distributed over multiple control devices, without departing from the scope of the disclosure.

The ATS 18 may be structurally configured in any suitable manner as is known in the art for air turbine starters. As referenced above, air turbine starters are part of a class of devices that convert air horsepower, which is a function of pressure, temperature, and air flow, into shaft horsepower which is a function of shaft torque and speed. Air turbine starters typically include a turbine that is spun using a high flow pressurized air source, and a gearing mechanism. The decoupler 20 may be configured as a decoupling clutch mechanism that disengages the ATS from the main turbine engine 22 once the ATS speed reaches the cutout speed and the startup operation of the main turbine engine is complete.

In general, a startup command is inputted from an external or main control device to the startup controller 12 of FIG. 1, and the circuitry of the controller 12 is thereby energized. Generally, the controller 12 outputs a first command signal to the SCV 16 such that the SCV provides a regulated pressure with the ATS speed corresponding to having a speed/torque curve below a maximum speed/torque curve of a predetermined transition speed. Once the ATS speed achieves the predetermined transition speed, the controller outputs a second command signal to operate the SCV 16 in a more open position to increase the ATS inlet pressure, and up to the fully open position with a correspondingly higher speed/torque curve. The ATS speed is acquired from an engine mounted speed pickup or from an air turbine starter mounted speed pickup to act as a feedback mechanism for monitoring the ATS speed during the engine startup procedure.

As further detailed below, the engine starter system 10 runs the ATS 18 in accordance with more than one speed/torque curve. The engine starter system 10 operates in accordance with a first speed/torque curve to start the gas turbine engine via the ATS without exceeding a maximum or design limiting torque of the turbine engine and any intermediary torque transfer apparatus. In particular, referring to FIG. 1 the controller 12 applies a "begin pressure ratio" (Begin PR) command to the SCV 16, whereby the SCV 16 regulates the input pressure from the external pressure source 14 to operate the ATS 18 in accordance with the first speed/torque curve. Overall start time is reduced when the engine starter system 10 subsequently operates in accordance with a second speed/torque curve using a higher inlet pressure once the ATS reaches the predetermined transition speed, at which point torque on the higher second pressure curve still remains less than the maximum or design limiting torque. In particular, once the ATS reaches the predetermined transition speed, the controller 12 applies a "final pressure ratio" (Final PR) command to the SCV 16, whereby the SCV 16 regulates the input pressure from the external pressure source 14 to operate the ATS 18 in accordance with the second speed/torque curve. The Final PR may correspond to the SCV being operated in the fully open position.

The ATS 18 in turn operates to drive rotation of the engine 22 to start the engine. By operating the ATS in accordance with the first speed/torque curve until the ATS reaches the predetermined transition speed, and once the ATS reaches the predetermined transition speed operating the ATS in accordance with the second speed/torque curve, a more efficient startup is achieved in a reduced duration. The engine 22 is coupled to the ATS 18 by the decoupler 20, wherein the engine 22 transmits a speed signal back to the controller 12 in a feedback mechanism. Alternatively, speed measurements may be taken directly off of the ATS and provided to the controller 12. Once the cutout speed is achieved, the completion of the gas turbine engine startup procedure is reached at which point the controller 12 commands the SCV 16 to close by removing the command signals.

Figure 2:
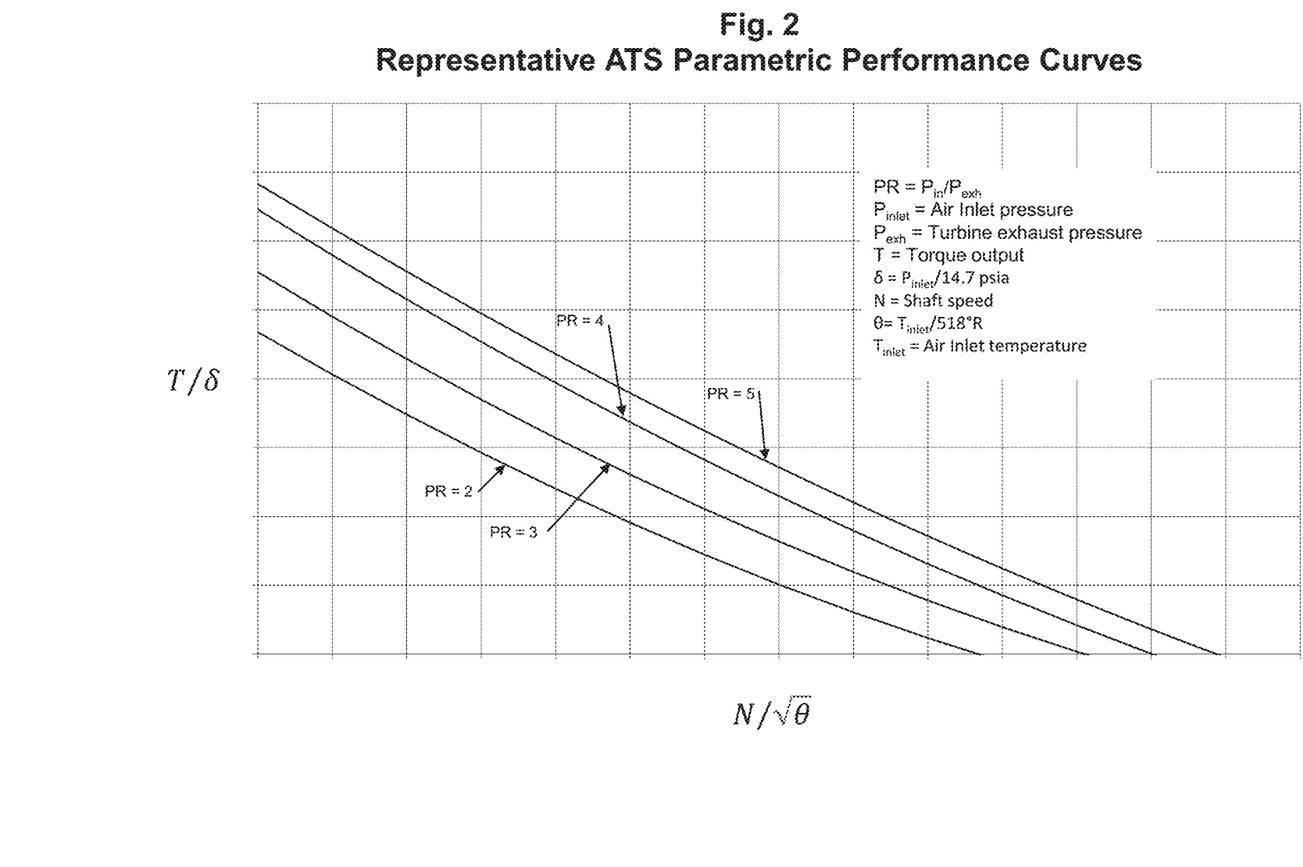
FIG. 2 is a graphical depiction of ATS parametric performance curves illustrating exemplary speed/torque curves to illustrate operation of the ATS.

FIG. 2 is a graphical depiction of ATS parametric performance curves illustrating exemplary speed/torque curves at various pressure ratios (inlet pressures) to illustrate operation of the ATS. FIG. 2 depicts an ATS performance plot, wherein the ATS output is normalized by a thermodynamic pressure ratio on a torque axis and by a thermodynamic temperature ratio on a speed axis. Torque versus speed is commonly plotted on a graph such as FIG. 2 to depict the relationship for a given ATS input air flow of a known pressure, temperature, and flow rate. As seen in FIG. 2, torque provided by the ATS to the engine is highest at zero ATS speed, referred to as the stall torque, and torque and is lowest at the highest ATS speed, referred to as the free run speed characterized as zero output torque. The stall torque is largely a function of an inlet pressure ratio while the free run speed is largely a function of a temperature ratio, wherein between the pressure ratio and the temperature ratio the degree of influence upon the gas turbine engine varies. Here, each depicted curve is based on a given starter pressure ratio, defined as a stator absolute total inlet pressure divided by a turbine absolute static outlet pressure. The curves further are associated with one air turbine starter with a flow characterized by its flow factor, which is a function of air flow, the pressure ratio, and the temperature ratio referenced above.

FIG. 2 illustrates four exemplary speed/torque curves (PR=2, PR=3, PR=4, and PR=5) for a given ATS operation. In practical usage, a starting torque of the ATS should be below the design limiting torque of the turbine engine and any torque transfer apparatus to prevent damage to the system. As torque decreases with speed, the torque will always remain below such maximum design limiting torque when operating in accordance with a speed/torque curve in which the starting torque is below the design limiting torque. As seen in FIG. 2, however, the lower the starting torque the lower the torque as speed increases at any given point on the speed/torque curve, thereby corresponding to a lower torque of operation being applied from the ATS to the engine. It is desirable, therefore, to employ a speed/torque curve that can maximize torque as speed increases without exceeding the design limiting torque. FIG. 2 illustrates that in employing any one of the illustrated speed/torque curves, the torque decreases substantially as speed increases.

To optimize the operating torque applied from the ATS to the engine without exceeding the design limiting torque, the engine starter system controller 12 commands the SCV 16 to regulate the input pressure to the ATS 18 to operate the ATS 18 in accordance with more than one speed/torque curve during the engine startup procedure. In particular, the controller 12 commands the SCV 16 to regulate the inlet pressure to the ATS 18 in accordance with a first speed/torque curve (e.g., Begin PR of FIG. 3) to initiate the gas turbine engine startup without exceeding a maximum or design limiting torque. Overall duration of the startup process is reduced by the controller subsequently commanding the SCV 16 to regulate at a higher pressure to operate the ATS 18 in accordance with a second speed/torque curve (e.g., Final PR of FIG. 3) having a higher operational pressure once the ATS reaches a predetermined transition speed. The torque applied by the ATS to the engine at the predetermined transition speed on the higher pressure second speed/torque curve still remains less than the design limiting torque, but provides a higher torque as compared to the first speed/torque curve to reduce the duration of the startup procedure. As referenced above, the second speed/torque curve may correspond to the SCV being operated in the fully open position, although any suitable SCV position may be employed provided the second speed/torque curve provides higher torque at any given speed as compared to the first speed/torque curve, and does not exceed a maximum or design limiting torque.

Figure 3:
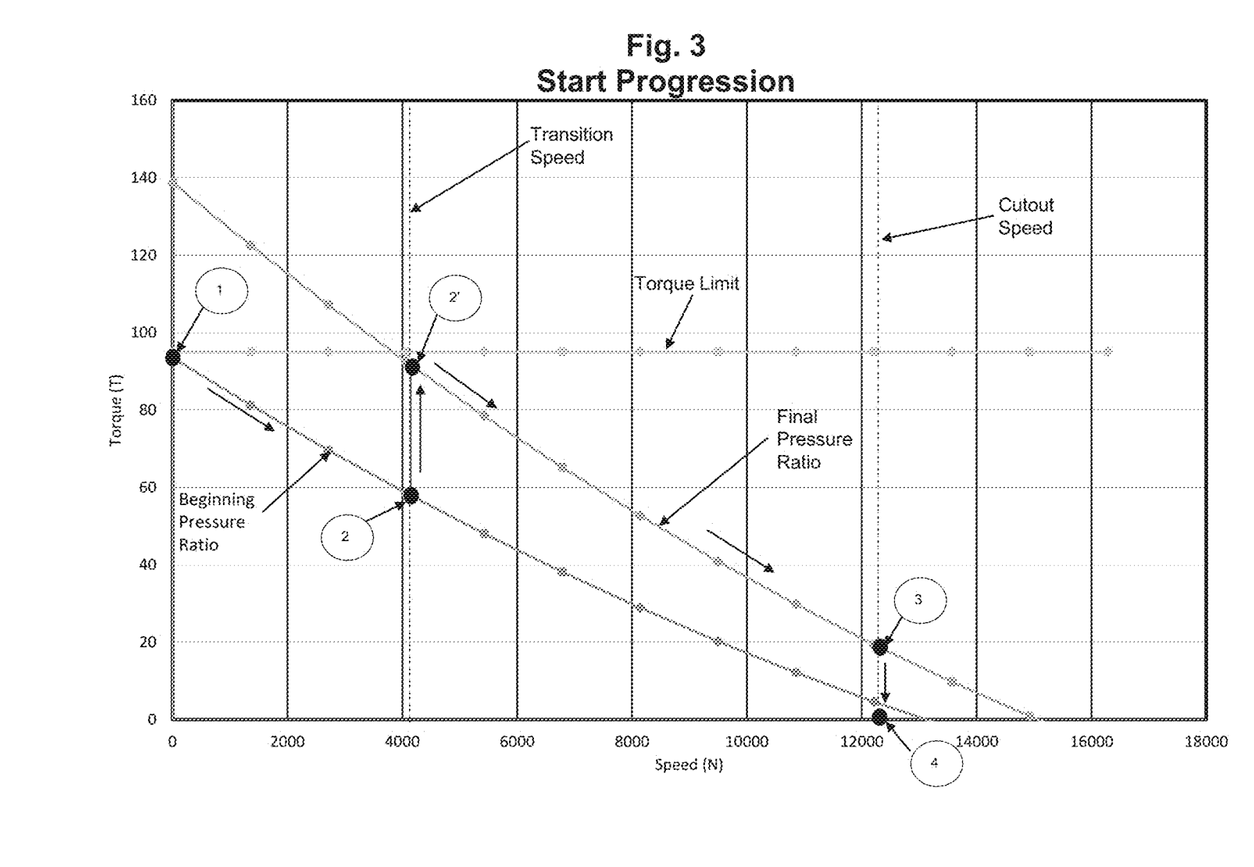
FIG. 3 is a graphical depiction of an exemplary startup procedure for control of the ATS to implement engine startup.

FIG. 3 is a graphical depiction of an exemplary startup procedure for control of the ATS to implement engine startup in a manner that optimizes the operating torque without exceeding the design limiting torque in accordance with the above. Initially, the ATS is operated in accordance with a first or beginning speed/torque curve PR1. In the initial state indicated at Point 1, the ATS speed is zero and thus the torque applied by the ATS to the engine is maximum at this stall torque, and the input pressure for PR1 is selected such that the initial stall torque at Point 1 less than (although near) the design limiting torque as indicated by the horizontal line in FIG. 3. In accordance with the first speed/torque curve PR1, as the ATS speed increases under the input pressure the torque applied by the ATS to the engine decreases to Point 2. The speed at Point 2 is referred to as the transition speed and is indicated by the first vertical line in FIG. 3. For example, as illustrated in FIG. 1 the transition speed may be measured based on an output speed signal communicated from the engine 22 to the controller 12 as a feedback mechanism, or a comparable speed measurement may be taken directly off of the ATS.

As further illustrated in FIG. 3, once the ATS speed reaches the transition speed at Point 2, the ATS subsequently is operated in accordance with a final or second speed/torque curve PR2. At the transition speed, the input pressure is altered by operation of the SCV to transition the inlet pressure to the ATS to the second speed/torque curve PR2 at Point 2'. In the transitional state indicated at Point 2', the torque applied by the ATS to the engine is raised relative to Point 2, and the input pressure for PR2 also is selected such that the transitional torque at Point 2' is less than (although near) the design limiting torque indicated by the horizontal line in FIG. 3. The transitional torque at Point 2' may be the same as the initial stall torque at Point 1, but this need not be the case. In accordance with the second speed/torque curve PR2, as the ATS speed increases under the input pressure the torque applied by the ATS to the engine decreases to Point 3. Because at the transition speed the second speed/torque curve PR2 has a greater torque at Point 2' than the torque at Point 2 on the first speed/torque curve PR1, the operational torque after the transition along the second speed/torque curve PR2 will be higher than had operation been maintained in accordance with the first speed/torque curve PR1. In this manner, by using such a higher operational torque of the second speed/torque curve PR2, the duration of the engine startup procedure is reduced as compared to conventional configurations.

The speed at Point 3 is referred to as the cutout speed and is indicated by the second vertical line in FIG. 3. The cutout speed corresponds to the speed at which the startup operation is complete, and the engine is fully operational and begins receiving fuel from the fuel system. Again, as illustrated in FIG. 1 the speed may be measured based on an output speed signal communicated from the engine 22 to the controller 12 as a feedback mechanism, or a comparable speed measurement may be taken directly off of the ATS. At the cutout speed of Point 3 with the engine startup process complete, the controller 12 removes all command signals to the SCV 16, causing it to close. The ATS is decoupled from the engine and thus the torque applied by the ATS to the engine goes to zero as indicated at Point 4.

The initial stall torque and the transitional torques (Points 1, 2, and 2' of FIG. 3), as well as the transitional speed and the cutout speed (indicated by the vertical lines in FIG. 3), may be predetermined or selected as may be suitable for any particular application or engine starter system. In addition, the startup procedure in FIG. 3 employs only two speed/torque curves including a beginning speed/torque curve and a final speed/torque curve. The use of two speed/torque curves provides a simple process to implement for maintaining increased torque as compared to conventional configurations. One or more additional speed/torque curves may be employed at corresponding one or more additional transition speeds, between the beginning speed/torque curve and the final speed/torque curve. In this manner, stepwise transitions to such additional speed/torque curves permit maintaining a relatively high torque throughout the startup procedure, although such process using more than two speed/torque curves is more complex to implement than the base procedure employing only two speed/torque curves.

Figure 4:
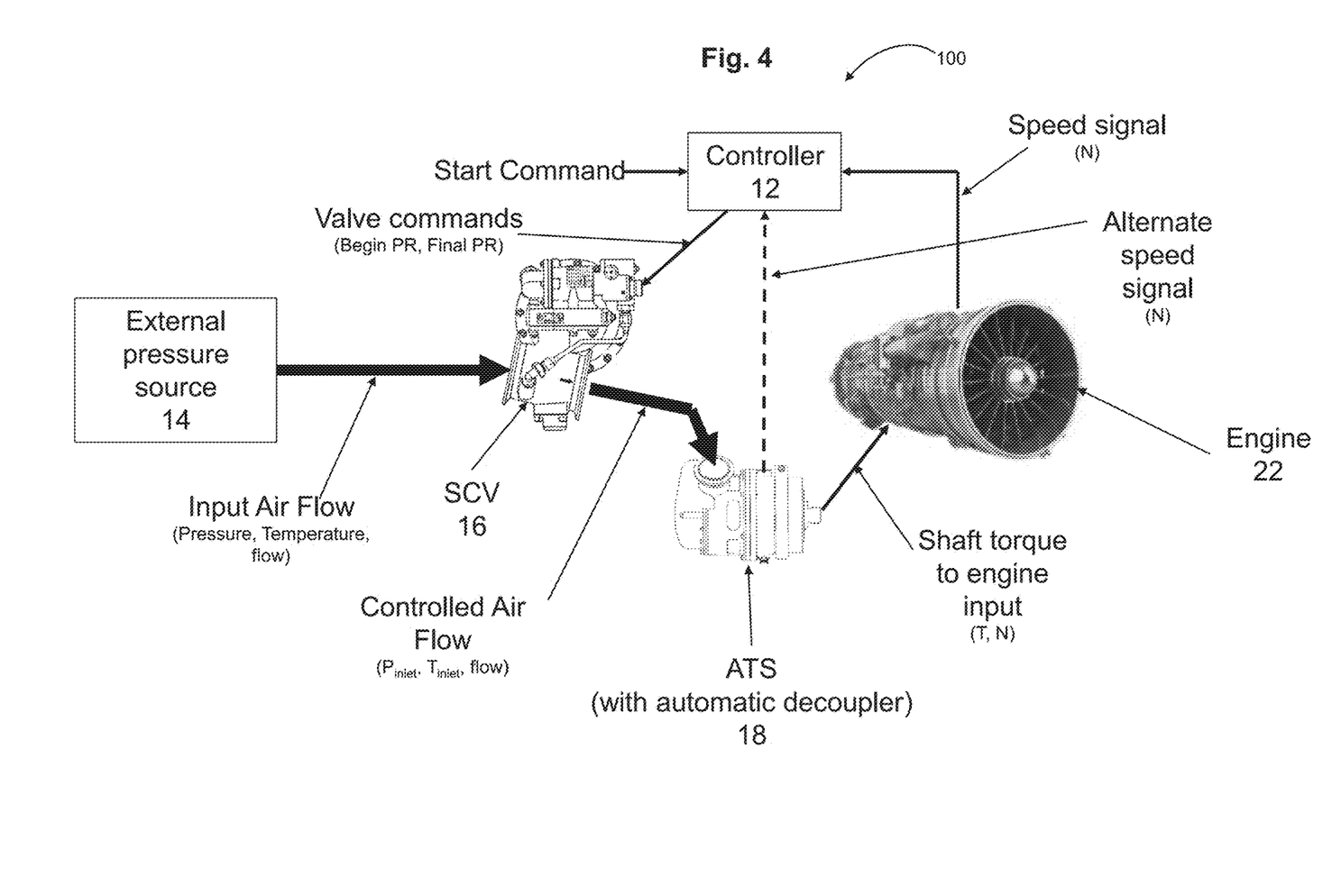
FIG. 4 is a drawing depicting a schematic diagram of an exemplary engine starter system in accordance with embodiments of the present application

FIG. 4 is a drawing depicting a schematic diagram of an exemplary air turbine starter system 100 in accordance with embodiments of the present application. The depiction of the system 100 is analogous to the block diagram of FIG. 1, and thus like reference numerals are used in FIG. 4 as to comparable components. The engine starter system 100 includes the controller 12, the external pressure source 14, the starter control valve (SCV) 16, and the air turbine starter (ATS) 18 with an automatic decoupler as described above. The ATS 18 operates to initiate startup of an engine 22, such as a gas turbine engine, and the ATS 18 is coupled to the engine 22 via the automatic decoupler provided as part of the ATS 18. The SCV 16 is illustrated as a three-state regulator valve that is in signal communication with the controller 12. The controller 12 receives a start command and then generates valve commands as described above for control of operation of the SCV 16 to regulate the input air flow from the external pressure source 14. The controlled air flow is then provided from the SCV 16 to the ATS 18, which in turn provides shaft torque to the engine 22 to perform the startup procedure described above in connection with FIG. 3. As part of such operation, the speed signal from the engine 22 and the alternative speed signal from the ATS are provided to controller 12 for operation in accordance with the speed/torque curves of FIG. 3.

As referenced above, although the engine starter system of the present disclosure is described principally in connection with the startup of turbines in gas turbine engines, comparable principles may be applied to the startup of the rotary components of other types of engines. For example, the engine starter system can be used to accomplish starting of other combustion engine types, such as for example reciprocating internal combustion engines. The engine starter system can also be used in other applications, such as for example in continuous duty turbine drives, in which high torque mitigation at low speed is desired.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above-described elements (components, assemblies, devices, compositions, etc.), the terms (including a reference to a "means") used to described such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of starting a turbine engine comprising the steps of:
    a control valve receiving an external flow of pressurized air and regulating a pressure of the external flow to provide an input flow of pressurized air to an air turbine starter;
    the air turbine starter receiving the input flow of pressurized air from the control valve, wherein the air turbine starter rotates during a startup procedure of the turbine engine to apply torque to the turbine engine to start the turbine engine;
    a controller commanding the control valve to provide a first input pressure to operate the air turbine starter in accordance with a first speed/torque curve until a speed of the air turbine starter reaches a predetermined transition speed;
    detecting that the speed of the air turbine starter has reached the predetermined transition speed; and
    in response to the speed of the air turbine starter reaching the predetermined transition speed, the controller commanding the control valve to provide a second input pressure to operate the air turbine starter in accordance with a second speed/torque curve until the speed of the air turbine starter reaches a predetermined cutout speed, wherein a torque at a given speed along the second speed/torque curve is greater than a torque at the given speed along the first speed/torque curve.

2. The method of starting the turbine engine of claim 1, wherein an initial torque applied by the air turbine starter at zero speed on the first speed/torque curve is below a design limiting torque of the turbine engine.

3. The method of starting the turbine engine of claim 1, wherein a torque applied by the air turbine starter at the predetermined transition speed on the second speed/torque curve is below a design limiting torque of the turbine engine.

4. The method of starting the turbine engine of claim 1, wherein an initial torque on the first speed/torque curve and the torque at the predetermined transition speed on the second speed/torque curve are equal.

5. The method of starting the turbine engine of claim 1, further comprising monitoring the speed of the air turbine starter by the controller receiving a speed signal off of the turbine engine.

6. The method of starting the turbine engine of claim 1, further comprising monitoring the speed of the air turbine starter by the controller receiving a speed signal directly off of the air turbine starter.

7. The method of starting the turbine engine of claim 1, wherein a default position of the control valve in the absence of the external flow of pressurized air is a closed position.

8. The method of starting the turbine engine of claim 1, wherein a position of the control valve when the air turbine starter is operating in accordance with the second speed/torque curve is a more open position as compared to a position of the control valve when the air turbine starter is operating in accordance with the first speed/torque curve.

9. The method of starting the turbine engine of claim 8, wherein the position of the control valve when the air turbine starter is operating in accordance with the second speed/torque curve is a fully open position.

10. The method of starting the turbine engine of claim 1, further comprising decoupling the air turbine starter from the turbine engine when the speed of the air turbine starter reaches the predetermined cutout speed.

11. An engine starter system comprising:
    an air turbine starter that receives an input flow of pressurized air, wherein the air turbine starter is configured to rotate during a startup procedure of a turbine engine to start the turbine engine;
    a starter control valve that receives an external flow of pressurized air and regulates the external flow to provide the input flow of pressurized air to the air turbine starter;
    a controller configured to command the starter control valve to provide a first input pressure to operate the air turbine starter in accordance with a first speed/torque curve until a speed of the air turbine starter reaches a predetermined transition speed; and
    in response to the air turbine starter reaching the predetermined transition speed, the controller is configured to command the starter control valve to provide a second input pressure to operate the air turbine starter in accordance with a second speed/torque curve until the speed of the air turbine starter reaches a predetermined cutout speed, wherein a torque at a given speed along the second speed/torque curve is greater than a torque at the given speed along the first speed/torque curve.

12. The engine starter system of claim 11, wherein the controller is configured to receive a speed signal off of the turbine engine and is further configured to monitor the speed of the air turbine starter by monitoring the speed signal.

13. The engine starter system of claim 11, wherein the controller further is configured to monitor a speed of the air turbine starter by monitoring a speed signal directly off of the air turbine starter.

14. The engine starter system of claim 11, wherein a default position of the starter control valve in the absence of any controller command is a closed position.

15. The engine starter system of any of claim 11, wherein a position of the starter control valve when the air turbine starter is operating in accordance with the second speed/torque curve is a more open position as compared to a position of the starter control valve when the air turbine starter is operating in accordance with the first speed/torque curve.

16. The engine starter system of claim 15, wherein the position of the control valve when the air turbine starter is operating in accordance with the second speed/torque curve is a fully open position.

17. The engine starter system of claim 11, wherein the control valve is a three-state regulator control valve.

18. The engine starter system of claim 11, wherein the air turbine starter comprises a turbine and gearing.

19. The engine starter system of claim 11, further comprising a decoupler configured as a clutch configured to decouple the air turbine starter from the turbine engine when the speed of the air turbine starter reaches the predetermined cutout speed.

\* \* \* \* \*